June 25, 1968     D. G. SCHULTZ     3,389,651
PORTABLE CHARCOAL BROILER
Filed March 8, 1966     3 Sheets-Sheet 1
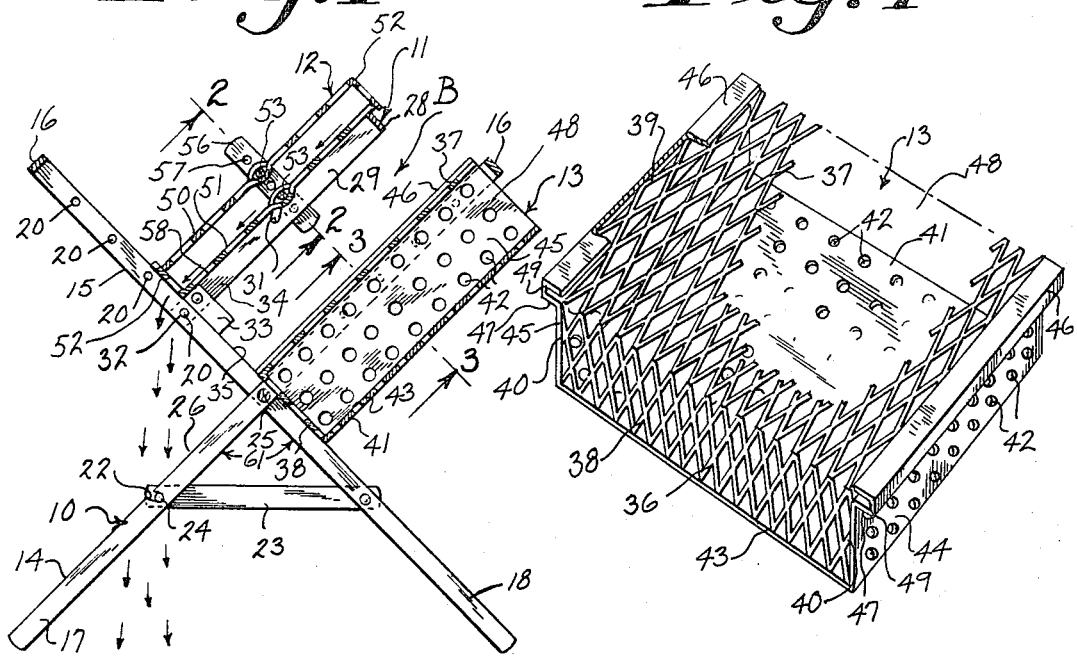
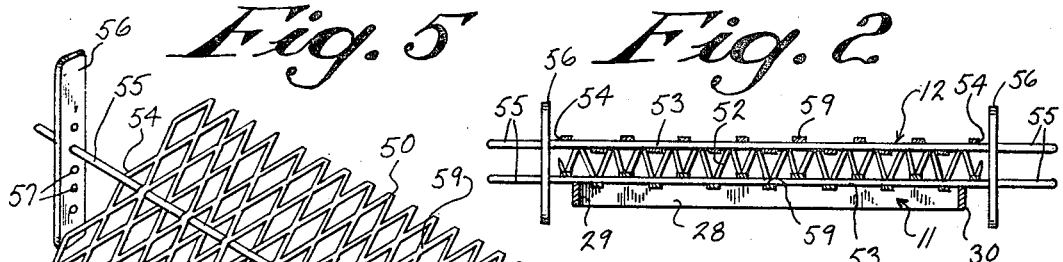
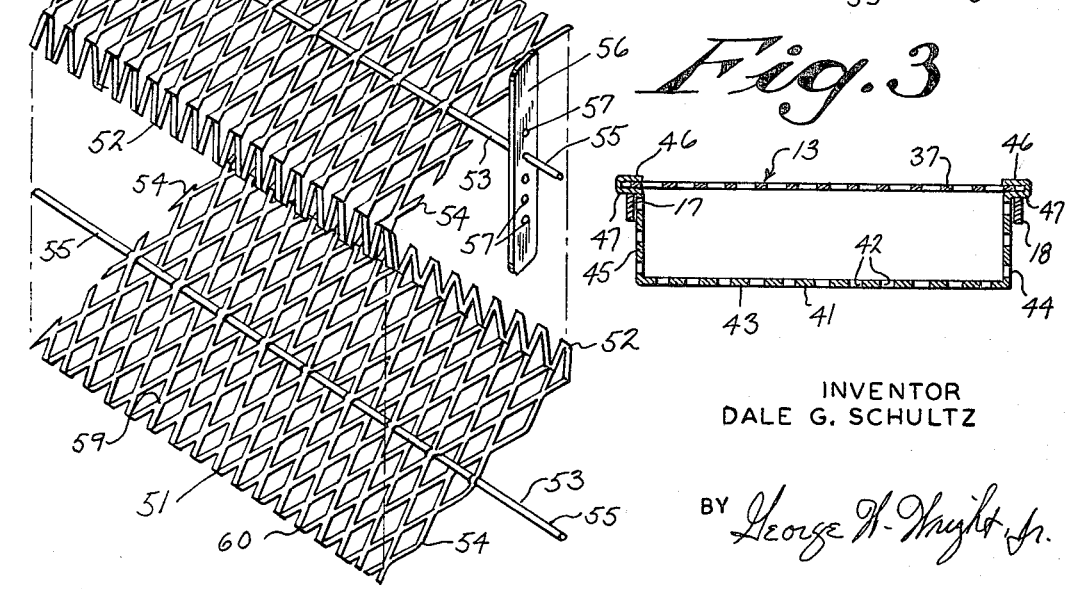
INVENTOR
DALE G. SCHULTZ
BY *George W. Wright, Jr.*

June 25, 1968  D. G. SCHULTZ  3,389,651
PORTABLE CHARCOAL BROILER
Filed March 8, 1966  3 Sheets-Sheet 2
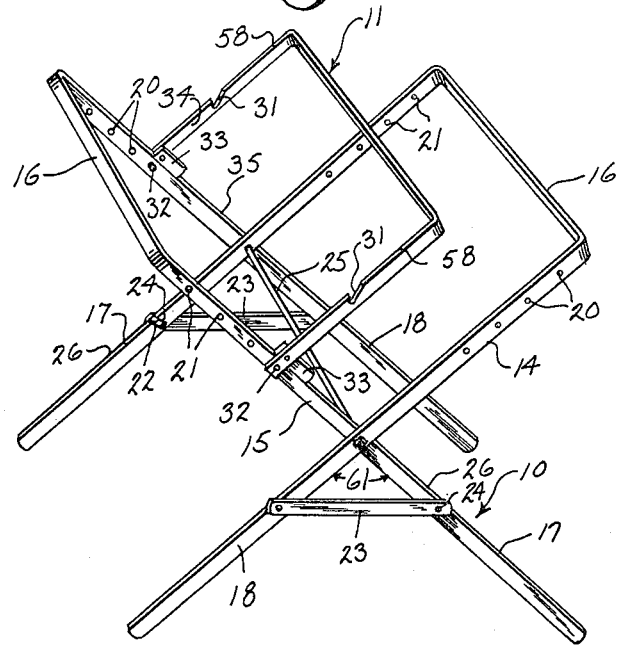
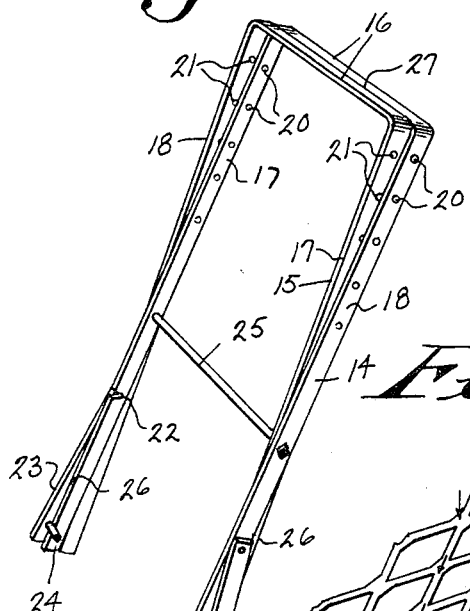
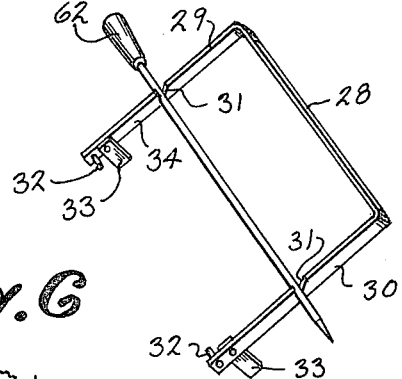
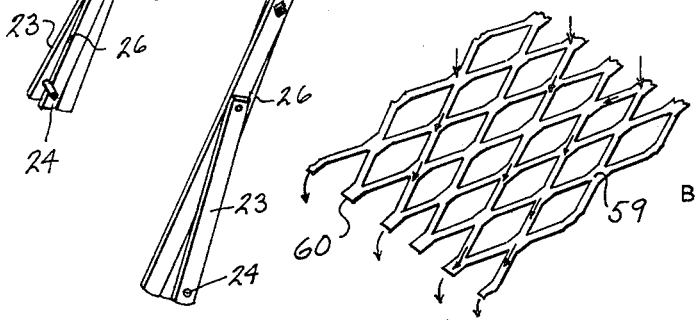
INVENTOR
DALE G. SCHULTZ
BY
George W. Wright, Jr.

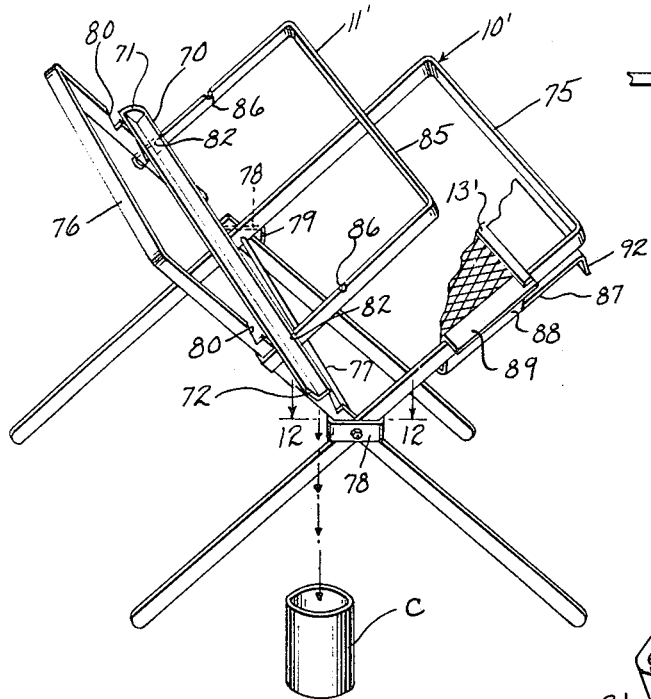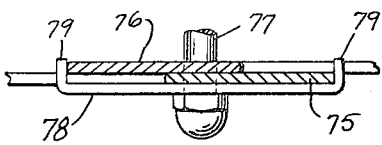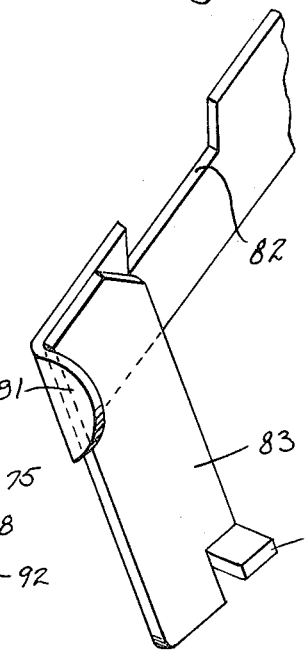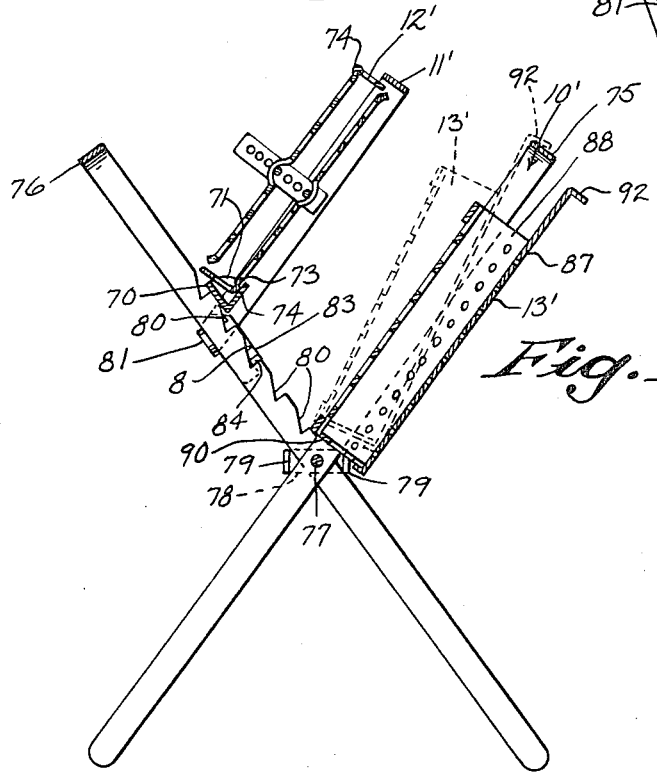

United States Patent Office 3,389,651
Patented June 25, 1968

3,389,651
PORTABLE CHARCOAL BROILER
Dale G. Schultz, 2332 W. Kilbourn,
Milwaukee, Wis. 53233
Continuation-in-part of application Ser. No. 324,978,
Nov. 20, 1963. This application Mar. 8, 1966, Ser.
No. 543,759
8 Claims. (Cl. 99—393)

ABSTRACT OF THE DISCLOSURE

A portable charcoal broiler of the type adapted to have an operative position and collapsible inoperative position. The operative position having means for supporting a firebox below the food holding grid in such a position that both the firebox and grid are at an angle from the horizontal the grid being so constructed and arranged that grease and fats emanating from the food will move by gravity and molecular adhesion to the lowermost point of the grid. The lowermost point of the grid extending beyond the corresponding lowermost point of the firebox so that the grease and fats dripping therefrom will not enter the coals and touch the firebox.

---

This invention appertains to portable broilers for food broiling and the like, and more particularly to new and useful improvements in an apparatus for angular broiling, and this application forms a continuation in part of my prior application Ser. No. 324,978, filed Nov. 20, 1963 and entitled "Portable Broiler and Method of Angular Broiler", now abandoned.

Outdoor charcoal broiling, grilling and the like has become an all-year-round national pastime and its popularity has resulted in a multimillion dollar business in the manufacture and sale of portable broiler and grills and accessories therefor.

One of the most widely used types of so-called outdoor charcoal grills is the horizontal type, having a round dish or bowl shaped fire box supported on legs or wheels and over which the food and meats are placed on a flat grill for cooking. This horizontal type of grilling or broiling has certain disadvantages and inefficiencies, in that, the drippings or rendered grease fall directly into the fire pot or box and contact the hot fuel or charcoal. Due to their incomplete combustion they return to adhere to the meat or other food being cooked in an unwholesome, unpleasant, unhealthful form of soot, lamp black and other hydrocarbons frequently found in coal tars. Many people seeking to prevent this undesirable effect, wrap their meats and other food products in aluminum foil. Foods thusly cooked, however, can hardly be called broiled or grilled, but in fact are steamed. Metal foil sales, however, show that millions of people prefer this to the blackened products derived from the standard methods of horizontal charcoal broiling, particularly where the more fatty foods are used.

Further, burning greases and grease dripping from the food onto the hot coals, besides causing undesirable fumes, smoke and "flare ups," require frequent dousings by the attendant with water, and thus do not produce a clean radiant heat which is desirable and needed for proper charcoal broiling. Also the pleasure of charcoal broiling is greatly reduced.

It is also very difficult to dump the hot coals from the horizontal pot and to carry the coals to a safe place where they will not be walked upon by unwary individuals.

Another method used in the past in an effort to overcome the disadvantages of horizontal broiling has been from the manufacturing standpoint, and attempts have been made to provide various types of vertical broiling devices, in which the fire box is vertically supported and types of wire grills or toasters are provided for holding or suspending the meats or foods in spaced vertical relation from the fire pot. It is obvious that one disadvantage is overcome, namely that the greases rendered must necessarily drip off by gravity from the lowermost point of the wire grills. While overcoming one disadvantage, vertical broiling presents several others, and it is believed that because of these disadvantages vertical broiling has never become especially popular. One of the prime disadvantages resides in the fact that the use of the clean radiant heat is inefficient and there is a great loss of heat. Further, the meats or foods are cooked unevenly and tend to cook faster at the top of the grill than at the bottom of the grill. Another disadvantage resides primarily in the use of flimsy wire grills for holding the meat products and the lack of versatility of the grills, in that, they are not designed to hold meats of various thicknesses and types. This is undoubtedly due to the fact that being vertically suspended they cannot be braced by the frame except at the top or bottom.

It is, therefore, a primary object of my present invention to provide a new broiler structure designed for angle broiling which will overcome all of the above mentioned deficiencies and inadequacies, and which will expose the meat and other foods directly to clean radiant heat and at the same time conduct the rendered grease to a point clear of the fire box and fuel held therein.

Another important object of my present invention is to provide a novel portable broiler for accomplishing the above purpose which will always expose the meat and other goods to the clean radiant heat without sacrificing any of the desirable features and advantages of charcoal broiling and wherein the grid for holding the food is positioned over the fire box and the distance between the grid and fire box may be adjusted as desired.

A further object of my invention is to provide a novel portable grill which is of lightweight construction and can be easily carried and kept in a clean condition, and wherein a folding frame is provided which has a collapsible position and an open operable position having means in its open operable position to support the grill above the fire box so that the food or meat products held in the grill or grid can be evenly cooked.

Still another object of my present invention is to provide a novel folding frame which is so constructed that it always opens in the same way and wherein each element of the folding frame is identically formed so that the grill and fire box can be supported on either side of the frame in proper angular relation to the frame and in substantially parallel relation one to the other.

A salient feature of my present invention resides in the novel construction of the food holding grid, the same being formed from expanded metal of any desired geometric pattern in such a manner that the rendered grease and fats will be conducted by molecular adhesion along the gird and travel by gravity to the lowermost end thereof where it will be free to drip clear of the fire box. The grid is primarily constructed of two opposed members having inturned end flanges arranged at the top and bottom of the grid so that the grid can hold any type of meat or food product, such as thin bacon, and yet expand to hold double thick steaks, chicken halves, or other fowl, without likelihood of food dropping to the ground.

Another very important object of my present invention lies in providing a portable and collapsible charcoal broiler which allows the food products to be cooked in a clean wholesome manner, and to nevertheless acquire the desired charcoal flavor and which eliminates all types of grease fires and "flare ups," soot and carbon deposits on the products, and yet requires very little attention during the broiling and preparation of the food.

Still another object of my present invention is to provide a novel modified support for the grid in the nature of a grease channel adapted to both support the lower end of the grid and to carry and conduct the greases to one side of the broiler structure where they may be deposited into a container of any type.

A further object of my present invention is to provide a simple, practical and reliable construction that is economical to manufacture, easy to assemble and positive in its operation.

With the above and other objects in view, which will more readily appear as the nature of the invention is better understood, the same consists in the novel method, construction, combination and arrangement of parts hereinafter more fully described, illustrated and claimed.

A preferred and practical embodiment of my invention is shown in the accompanying drawings, in which, FIGURE 1 is a side elevational view of my portable broiler showing the fire box and grid in proper relation one to the other, a vertical section being taken through the grid and fire box to illustrate further details of construction;

FIGURE 2 is a transverse section through the grid and its supporting rack, the section being taken on the line 2—2 of FIGURE 1 of the drawings, and looking in the direction of the arrows;

FIGURE 3 is a transverse section through the fire box and its supporting member, the section being taken on the line 3—3 of FIGURE 1 of the drawings, and looking in the direction of the arrows;

FIGURE 4 is a top view in perspective of my fire box, certain portions being broken away and in section to illustrate further details in its construction;

FIGURE 5 is an exploded view of my novel grid utilized for holding the food products and clearly illustrating its adjustability to accommodate various types of food products;

FIGURE 6 is an enlarged fragmentary view of a portion of the grid illustrating particularly how the rendered grease and fats adhere by molecular adhesion and travel along the grid to the lower end thereof;

FIGURE 7 is an elevational view in perspective of my portable grill showing the folding frame and broiler rack with the grid and fire box removed;

FIGURE 8 is a perspective view of the folding frame in its collapsed position;

FIGURE 9 is a perspective view of the broiler rack shown removed from the folding frame member and illustrating how a rotisserie rod can be supported thereon;

FIGURE 10 is an elevational view in perspective similar to FIGURE 7 of the drawings but showing a preferred modification of the folding frame and broiler rack;

FIGURE 11 is a vertical section similar to FIGURE 1 of the drawings but illustrating the preferred modification;

FIGURE 12 is an enlarged fragmentary section taken on the line 12—12 of FIGURE 10 of the drawings and looking in the direction of the arrows, and FIGURE 13 is a fragmentary enlarged view of the modified latching means utilized ordinarily with the form of the invention shown in FIGURES 10, 11 and 12.

Referring to the drawings in detail, wherein similar reference characters designate corresponding parts throughout the several views, the letter B generally indicates my novel portable broiler, and the same includes broadly the folding frame member 10, detachable broiler rack 11, novel food and meat holding grill 12 and the fire box 13.

Attention is now directed primarily to FIGURES 7 and 8 of the drawings, in which the folding frame member 10 is shown in both its open operable position and its folded or collapsed position (FIGURE 8). The frame 10 includes two identically formed U-shaped members 14 and 15 respectively. These members are fabricated from flat strips of metal to include an intermediate cross-bar 16 and parallel extending legs 17 and 18 in the shape of a U. Adjacent the cross-bars 16 of each member I provide a series of spaced apertures 20 and 21 on the legs 17 and 18 and these apertures are in alignment with one another, and their purpose will become apparent as the description proceeds. Each leg 17 below the center thereof has formed therein a keeper notch 22 and each leg has pivoted thereto at the same distance from its center a brace-bar 23. The outer end of each brace bar is provided with an inwardly extending guide and locking pin 24 and when the two frame members 14 and 15 are pivotally secured together at their axial centers by the rod 25, it can be seen that the guide and locking pins will each be adapted to slidably engage the surface 26 of each leg 17 and ride along the surface from the closed position until the locking pin engages and is received in the keeper notches 22. Thus, it can be seen that the frame member 10 can be automatically opened to the position shown in FIGURE 7 and the brace bar members will automatically lock in place and hold the frame members 14 and 15 in their extended operable position. Inasmuch as each of the members 14 and 15 is identically formed, as previously brought out, one member will not telescope within the other when the frame is folded to its closed inoperative position shown in FIGURE 8, and the bars 16 will abut at the point 27, as shown. Obviously, when the members 14 and 15 are assembled at the factory, leg 17 of one member will be pivotally secured at the inside surface of the adjacent leg 18 of the other member, and similarly the leg 17 of the first member 15 will lie within the leg 18 of the second member 14. Thus the automatic locking and setting up of the frame is assured and the same will be opened to the exact position each time. I also provide, as shown primarily in FIGURES 7 and 9 of the drawings, a broiler rack which is U-shaped to provide a cross-bar 28 and side supporting legs 29 and 30 respectively. The upper surface of each leg 29 and 30 is provided with an aligned notch 31. The legs 29 and 30 of the broiler rack 11 are spaced so that their end terminations are in engagement with the other surface of the respective legs 17 and 18 of either member 14 or 15. Thus, it can be seen that the broiler rack can be associated with either of the frame members 14 or 15 and in order to properly support the rack in reference to either of the members 14 or 15, I provide each leg 29 and 30 with an inwardly directed pivot pin 32 and right angularly extending supporting feet 33 secured to the inner surface 34 of each leg. The distance between each pin 32 and the supporting feet 33 is equal exactly to the distance between the apertures 20 and 21 and the respective surface 35 of legs 17 and 18. Thus, when the lock pins are secured in any one of the apertures 20 and 21 the supporting feet 33 will engage the respective surface 35 and the rack will be firmly supported in a parallel relation with the legs 17 and 18 of the adjacent frame member. It should also be noted that the height or distance that the broiler rack is spaced from its adjacent frame member depends upon the particular apertures 20 or 21 used. When the broiler rack is in place as shown in FIGURE 7, the entire frame assembly is ready to receive the grid member 12 and fire box 13. The fire box 13 is designed to be associated with and supported by legs 17 and 18 opposite the broiler rack. For this purpose the fire box is preferably fabricated from a sheet of expanded metal 36 bent to form the top wall 37 and bottom end wall 38. The top wall 37 has its longitudinal edges 39 extending beyond the longitudinal edges 40 of the bottom end wall. The primary charcoal holding portion of the fire box is formed from a length of sheet metal 41, which is provided with a series of openings 42 throughout its entire length, and the same is bent to form an inclined bottom wall 43 and upright parallel extending side walls 44 and 45 respectively. The upright side walls 44 and 45 are of a size and configuration to receive the end bottom wall 38 therebetween and the surface 40 of wall 38 abuts the inner surface of each upright side wall 44 and 45. Adjacent the upper end of each upright side wall 44 and 45 I provide an outwardly extending flange 46, which extends the entire length of the walls 44 and 45 and this flange is U-shaped and receives therein the peripheral edge extensions 39 of wall 37. These flanges besides reinforcing the fire box form supporting surfaces 47 which engage surface 38 of the respective legs 17 and 18 of either member 14 or 15, as shown more particularly in FIGURES 1 and 3 of the drawings. Thus, the upper end 48 of the fire box is open and fuel such as charcoal briquets and the like can be easily placed therein. It is obvious therefore that the fire can be started with the fire box removed from the frame, if desired, as well as when the fire box is in its operative position, as shown in FIGURE 1 of the drawings. It should also be noted that inasmuch as the walls 44 and 45 are spaced apart in such a way that they are just received within the upper portions of the legs 17 and 18, that the end terminations 49 of each flange 46 will abut the legs 17 and 18 respectively of the adjacent frame member, and thus the downward movement of the fire box is effectively prevented.

One of the most important features of my invention resides in the novel structure of my broiler grid member and the construction is such that the grid will hold a variety of different kinds and sizes of food products, collect the rendered greases as they form and cause them to adhere by molecular adhesion to the open metal mesh work and to travel along the bottom of the grid to a point beyond the fire box where the grease will drip into any improvised container, FIG. 10, or upon the ground in the direction of the arrows, FIGURE 1 of the drawings.

Therefore the grid 12 (FIGS. 2, 5 and 6), is fabricated from two identically shaped pieces 50 and 51 respectively of expanded metal of any geometric design. I have, however, found that a diamond shaped pattern of suitable dimension is ideally suited for this purpose and is also readily available in prefabricated form on the open market. Therefore, I have shown and illustrated expanded prefabricated metal of a diamond shape pattern. Each member 50 and 51 has one end 52 thereof turned at right angles to form in effect end walls when the members 50 and 51 are positioned opposite one another with the inturned ends in diametrically opposed positions. Each of the members 50 and 51 is further strengthened and provided with a bar 53. This bar or rod 53 is preferably secured through the longitudinal center and the metal is alternately offset so that the rod can be threaded through the metal and secured in place. It should be noted that the rods extend for a short distance beyond the outer end terminations 54 of the meat holding grids 50 and 51. The purpose of this is two-fold, in that, the end extensions 55 serve as handles for the grid proper and also cooperate with a pair of end adjustable fastening bars 56. These end fastening bars 56 are identically formed and are provided with a series of equally spaced apertures 57 of a size and configuration to receive the end termination of each of the rods 53. Thus it can be seen that the grid members 50 and 51 can be brought together to hold very thin meat, such as bacon, and also expanded by utilizing various intermediate and/or outermost apertures, to hold double thick steaks, or halves of chicken, and the inturned walls 52 serve to prevent the food from dropping onto the ground. With the adjustable fastening bars in operable position, as shown in FIGURE 1 of the drawings, they also act with the rods 53 as handles to easily maneuver the grid when it is desired to turn the same and expose the other side of the meat to the clean radiant emanating from the fire box The importance of the particular structure of the grid 12 is again stressed and it should be noted that each of the grid members 50 and 51 is of a size and configuration to rest completely on the upper surface 58 of the rack 11 and thus the grid is firmly supported by the rack and above the fire box. The downward movement of the grid is obviously prevented by the respective portions of the legs 17 and 18 of the folding frame member. Thus the grid can be turned to any position on the broiler rack and will firmly hold the meats and guide the rendered greases by molecular adhesion along its lower surface, where it will drip off the end and into a suitable container, and not onto the burning fuel. As previously mentioned, the exact geometric pattern of the grids is not important, but it is necessary that the pattern be of a fairly close weave as illustrated, and that the surface 59 thereof lie in a substantially flat plane, since the round wire type grill holders now on the market would not be satisfactory in this type of broiler, as the grease will still drip off the rounded wires and into the hot coals. FIGURE 6 of the drawings showing the fragmentary view of the grid, graphically illustrates this point, and the grease will flow in the direction of the arrows following the weave and flat surface 59 and be conducted to the end termination 60 of the respective grid portion. The angle between horizontal and vertical may be varied obviously; however, I have found that the ideal angle is a 45 degree angle from the ground, and therefore, the pivoted latch members 23 are positioned to lock the folding frame members to insure that the angle 61 will be a 90 degree angle. This automatically assures the positioning of the grid 12 and fire box 13 at a 45 degree angle from the ground. As previously mentioned, the broiler rack 11 is provided with notches 31, and in FIGURE 9 of the drawings, I have shown the use of a simple rotisserie rod 62, and this rod is so positioned that the rendered greases will likewise miss the fire box and be directed or conducted to the ground or to a suitable improvised container.

From the foregoing, it can be seen that I have provided a lightweight portable charcoal broiler, utilizing angle broiling and having many desirable features not found in the conventional horizontal broiling or conventional vertical broiling. Further, the broiler rack can be adjusted to bring the grid 12 closer to, or farther away from, the fire box depending on the type of foods being cooked, and the grid is held in a position so that it will always be over the fire box and exposed to the clean radiant heat Most important, however, the rendered grease will be conducted by molecular adhesion to the lowermost point of the grid where it can drip off at a point away from the fire box and burning coals held therein. The means and method of holding and containing meats and meat products in my specially designed grid is again stressed. This unique grid is designed to take the maximum advantage of the laws of physics pertaining to molecular attraction and adhesion (the natural attraction of unlike molecules to adhere) in this case, rendered greases and fats to metal. With this principle in mind, I then incline the grease retaining and withholding grid at such an angle to cause the liquid fats to travel by gravity to a lowermost point. Thus, by taking full advantage of two laws of physics (molecular attraction and gravity), I achieve absolute grease control, which is the primary object of the present invention. The fire box itself is of a simple construction and can be easily and readily-removed from the folding frame and the end flanges 46 thereof from convenient handles for manipulating the fire box. During the broiling of foods, extra fuel can readily be added through the open end 48 thereof and the fire box can be associated with either frame member 14 or 15 and the broiler rock 11 can also be quickly and readily associated with either frame member. The folding frame can be opened, and locks automatically in the same exact position, ready for use. After the meats have been cooked the fire box can be easily removed from the frame and the coals dumped in a safe spot and the fire box will be clean and free from food odors and the dirt associated in particular with the horizontal type charcoal broilers. Thus, my novel broiler can be readily carried in a car without fear of dirtying the interior of the vehicle, and of course, can be readily carried on any public conveyance in its collapsed, folded position. Further, the portability and collapsability of the frame and compact structure of the removable fire box and grid, together with the size and lightweight structure, make the broiler particularly adaptable for packaging and for mailing parcel post to rural and like areas. It should also be noted that while I have referred to charcoal and like fuel, the same could be readily adapted to any source of radiant heat, such as electricity, gas etc.

Attention is now directed to FIGURES 10 to 13, inclusive, in which I have illustrated a preferred modified form of the broiler. In this modified form, I provide a folding frame member 10', a detachable broiler rack 11', meat holding grill 12' and a fire box 13'. All of these members are similar in construction to that form of the invention illustrated in FIGURES 1 to 9, inclusive; however, I provide in addition a grease conducting channel member 70 which is formed from a piece of angle metal closed at one end 71 and open at its opposite end 72, so that grease will be conducted through the channel provided therein to the side of the folding frame and into a container C as indicated by the arrows in FIGURE 10 of the drawings. This channel member also acts to support one end 73 of the meat holding grill 12' and this feature will be described more in detail as the description proceeds. It should be noted at this time that for purposes of illustration and description, the meat holding grill 12' is practically identical to the meat holding grill 12 previously described and shown, except that the inner ends 74 of each part of the grill are bent to provide a transversely extending rib which acts to space the bottom of the grill 12' slightly above the surface of the grease channel member 70 and thus, as the grease adhering to the grill progresses downwardly it will not be obstructed and can easily flow to the bottom of the channel to be conducted as aforementioned.

Folding frame 10' as well as the detachable broiler rack 11' are constructed in a similar manner to their corresponding members previously described; however, they are made of a slightly larger dimension and therefore the folding frame 10' includes the U-shaped flat strips 75 and 76 pivoted at their axial center and joined by the rod 77. In lieu of brace bars 23, I provide a U-shaped brace member 78 which merely includes a strip of metal having inwardly turned flanges 79 which are secured between ends of the rod 77 so that flanges 79 engage the inner surfaces of members 75 and 76 at the axial center thereof to hold the frame in its open full line position as illustrated. Member 76 is provided with a series of spaced notches 80 on each leg thereof in lieu of the apertures 21 and the removable broiler rack 11' has its inner end terminations directed inwardly to provide for the members 81 respectively engaging the side legs of the member 76. Attention is now directed to FIGURE 13 of the drawings, illustrating an enlarged fragmentary view of one end of the removable broiler rack 11' and it can be seen that each leg is provided with a notch 82 of a size and configuration to receive the grease channel member 70 and secured adjacent the inturned member 81 is a flat strip of metal 83 adapted to lie slightly parallel with a respective leg of the member 76 as shown in dotted lines, FIGURE 11. The lower end termination of the strip 83 is formed with a struck-out teat 84 which engages in one of the notches 80 and cooperates with member 81 to firmly hold the broiler rack 11' in its operative position, as shown. To adjust the height of the broiler rack 11' it is merely necessary to grasp the outer cross member 85, tilt the broiler rack 11' slightly and slide it along the respective leg portions of member 76 until the teat 84 engages an adjacent slot. I also provide smaller recesses 86 in each leg of the rack 11' to receive the rod of the meat holding grill 12' so that the grill can be held in its operative full line position, FIGURE 11, as shown.

In this form of the invention I also provide a slight modification in the fire box which makes the same easier to handle and to load. Thus fire box 13' includes a bottom piece 87 formed of perforated sheet metal and the integral upwardly extending side walls 88. Side walls 88 at their upper ends are flared outwardly to provide a flange portion 89, note FIGURE 10, which rests on the upper edges of the legs of member 75 as shown by the fragmentary representation in FIGURE 10. The upper wall of the fire box is open wire mesh similar to the construction of the fire box in the previously described form of my invention. Bottom wall 87 extends beyond side walls 88 but is of a size and configuration to fit entirely within the area provided by the upper portion of member 75 and thus the fire box is supported by the flanges 89 and by the end wall 90 engaging the folding frame 10' adjacent its axial center, as illustrated. To load the fire box it may either be removed or simply tilted to its dotted line position, FIGURE 11, with the inturned edge 92 thereof engaging over the cross member of the folding frame 10'. Thus the fire box will be tilted and can be easily and quickly loaded.

It should also be observed that due to the larger dimensions of the removable broiler rack 11', meat holding grill 12' fits entirely within the confines of the broiler rack and does not engage over the edges as illustrated in my previous form of the invention. It is supported merely by the lower rod of the meat holding grill and the grease conducting channel member 70.

The importance of conducting the greases and fats away from the burning coals cannot be stressed too strongly. In fact, the National Cancer Institute has stated that charcoal broiling ordinarily coats meats with hydrocarbons identical to some that have caused cancer in experimental animals, and that such deposits stem primarily from the "flare-ups" caused by dripping grease from the meats. It has also been ascertained by experiment that the flavor imparted to meats by charcoal broiling is not primarily due to the fact that the grease drops on the coals and that the smoke therefrom imparts the flavor. It is rather the radiant heat that imparts the singular flavor to charcoal grilling, and this can be imparted to the foods without the necessity of "flare-up" caused by dripping grease.

The fact that this is a problem is further substantiated by Dr. Charles Huggens, cancer surgeon and scientist, who on Nov. 8, 1961 informed the United Press as follows: "Coal tar created by the decomposition of wood or coal is a problem just as it is in cigarettes. Coal tar deposits were found in products smoked in barbecues, charcoal broilers, and even those roasted over open fires."

Thus proper charcoal broiling comes from the heat of the coals and not from the flames of burning fat caused by cooking too soon. By utilizing the novel portable broiler of the instant invention, "flare-ups" and hydrocarbons caused thereby can be completely eliminated.

While I have shown and described certain specific embodiments of my invention, it will be understood that these embodiments are merely for the purpose of illustration and description and that various other forms may be devised and that changes may be made in the proportion and minor details of construction without departing from the spirit of the invention and scope of the appended claims.

I claim:

1. A portable charcoal broiler particularly adapted for angular broiling, including a supporting frame member, a fire box, means associated with said frame member for supporting said fire box at an angle in relation to the ground, a food holding grid, said food holding grid including two opposed identically formed members of prefabricated expanded metal of a similar geometrical pattern forming smooth flat surfaces, each prefabricated member having an inturned wall at one end thereof and being so constructed and arranged so that one wall is at the top of the grid and the other opposite wall at the bottom of the grid, a rod secured to each prefabricated member having its ends terminating beyond the respective edges of each member, said rods being in substantially parallel relation, fastening means for adjustably securing the respective ends of said rods in their spaced relation to one another, means associated with said frame for supporting said grid above said fire box and substantially parallel therewith, and means for adjusting the distance between the fire box and the grid.

2. A portable charcoal broiler as set forth in claim 1, wherein the means for supporting said grid above said fire box is so constructed and arranged as to support the grid in a position where its lowermost point extends beyond the corresponding point of said fire box.

3. A portable charcoal broiler particularly adapted for angular broiling comprising a folding frame, having an open operative position and a collapsible inoperative position, said frame including a pair of U-shaped members embodying two pairs of legs, the legs of each pair being pivotally connected intermediate their ends to provide upper diverging open supporting frame portions in its open position, a substantially rectangular shaped fire box of a size and configuration to fit within an upper open supporting frame portion, outwardly extending flanges along the upper side periphery of said fire box of a size and configuration to rest on an upper open supporting frame portion, a broiler rack carried by said other upper open supporting frame portion including, a pair of upwardly projecting parallel arms arranged in parallel relation with said fire box, a meat holding grid of a size and configurtion to be held on said broiler rack arms, said grid being fabricated of identical lengths of expanded metal weave, and means for holding said identical lengths of expanded metal portions together in opposed relation, whereby rendered grease will move by gravity and by molecular adhesion be conducted to the lowermost point of the grid.

4. A portable charcoal broiler as set forth in claim 3, wherein said means for securing the identical expanded metal pieces together includes, a transversely extended rod secured to each piece and extending from one side to the other, said rods having their ends terminating a substantial distance beyond the respective edges of the identically formed expanded metal pieces and being arranged in spaced parallel relation when said pieces are in their opposed meat holding position, and a pair of fastening bars each provided with spaced aligned apertures of a size and configuration to receive a respective end of a rod whereby the distance between the opposed expanded metal pieces can be adjusted to accommodate foods of varying thicknesses.

5. A portable charcoal broiler as set forth in claim 4, wherein said identically formed expanded metal pieces are each provided with a right-angularly extending wall on one end thereof and said pieces being so arranged when in opposed relation to provide a wall at each end of the grid.

6. A portable charcoal broiler as set forth in claim 4, wherein said identically formed metal weave portions are so constructed and arranged as to present flat upper and lower surfaces to increase and aid the molecular adhesion of the rendered greases.

7. A portable charcoal broiler particularly adapted for angular broiling as set forth in claim 1, wherein said geometrical pattern of each prefabricated member is of a diamond shape with the apex of the smaller angles arranged at the top and bottom in relation to said members.

8. A portable charcoal broiler particularly adapted for angular broiling as set forth in claim 3, wherein a grease conducting channel is positioned adjacent the lowermost point of the grid to conduct the grease to one side of said broiler.

References Cited

UNITED STATES PATENTS

| | | | |
|---|---|---|---|
| 2,109,079 | 2/1938 | Zeigler et al. | 99—390 X |
| 2,915,959 | 12/1954 | Stott | 99—390 X |
| 3,031,948 | 5/1962 | Lotter | 99—390 |
| 3,087,418 | 4/1963 | Albright | 99—400 X |
| 3,121,424 | 2/1964 | Russell | 126—25 |
| 3,152,586 | 10/1964 | Russell | 126—9 |
| 3,207,059 | 9/1965 | Hirons | 99—450 X |

FOREIGN PATENTS

| | | |
|---|---|---|
| 231,482 | 12/1960 | Australia. |
| 14,030 | 1895 | Great Britain. |

BILLY J. WILHITE, *Primary Examiner.*